US012679555B2

(12) United States Patent
Besnard et al.

(10) Patent No.: US 12,679,555 B2
(45) Date of Patent: Jul. 14, 2026

(54) SYSTEM FOR INTERACTING AT A DISTANCE WITH A POINTING MEANS OF AN HMI OF A VIEWING SYSTEM OF AN AIRCRAFT COCKPIT

(71) Applicant: THALES, Meudon (FR)

(72) Inventors: Mathieu Besnard, Merignac (FR);
Nicolas Couder, Merignac (FR);
Emmanuel Monvoisin, Merignac (FR);
Arnaud Petitdemange, Merignac (FR);
Anton Nabholz, Merignac (FR)

(73) Assignee: THALES, Meudon (FR)

( * ) Notice: Subject to any disclaimer, the term of this patent is extended or adjusted under 35 U.S.C. 154(b) by 0 days.

(21) Appl. No.: 18/952,999

(22) Filed: Nov. 19, 2024

(65) Prior Publication Data

US 2025/0171160 A1     May 29, 2025

(30) Foreign Application Priority Data

Nov. 28, 2023    (FR) ...................................... 2313193

(51) Int. Cl.
B64D 43/00          (2006.01)
G06F 3/0354        (2013.01)
G06F 3/039          (2013.01)

(52) U.S. Cl.
CPC ......... B64D 43/00 (2013.01); G06F 3/03547 (2013.01); G06F 3/0393 (2019.05)

(58) Field of Classification Search
CPC .......... G06F 3/01; G06F 3/033; G06F 3/0338;

G06F 3/03547; G06F 3/0393; G06F 3/03416; G06F 3/048; G06F 3/0488; B60K 35/10; B60K 35/22; B60K 35/50; B60K 35/60; B60K 2360/117; B60K 2360/139; B60K 2360/1434; B60K 2360/1438; B64D 43/00; B90Y 2200/50
See application file for complete search history.

(56) References Cited

U.S. PATENT DOCUMENTS

| | | | | |
|---|---|---|---|---|
| 9,084,490 B2 * | 7/2015 | Kerdreux | ............... | B64D 43/00 |
| 10,732,774 B1 * | 8/2020 | Gosch | ..................... | G06F 3/044 |
| 11,772,811 B2 * | 10/2023 | Besnard | ................. | B60K 35/25 |
| | | | | 345/156 |
| 2011/0303802 A1 * | 12/2011 | Nutaro | ..................... | G05G 1/62 |
| | | | | 248/118 |

(Continued)

FOREIGN PATENT DOCUMENTS

| | | | |
|---|---|---|---|
| EP | 0 721 629 A1 | 7/1996 | |
| EP | 2 808 763 A2 | 12/2014 | |

(Continued)

*Primary Examiner* — Amr A Awad
(74) *Attorney, Agent, or Firm* — BakerHostetler

(57) ABSTRACT

A system for interacting at a distance with a pointer of a human-machine interface (HMI) of a viewing system of an aircraft cockpit, including three layers including an upper layer in the shape of an inverted V, which itself acts as a handrest knob, including a module, with a touch-sensitive flat surface, arranged on a front portion of the inverted V; at least one physical interactor to interact with the HMI arranged on a rear portion of the inverted V; and two lateral edges set back from the upper surface of the upper layer, each provided with at least one physical interactor.

9 Claims, 10 Drawing Sheets

(56) References Cited

U.S. PATENT DOCUMENTS

| | | | | |
|---|---|---|---|---|
| 2012/0105335 A1* | 5/2012 | Suddreth | ............... | G06F 3/0393 |
| | | | | 345/173 |
| 2014/0062884 A1* | 3/2014 | Davies | ................. | G06F 3/0362 |
| | | | | 345/167 |
| 2016/0011685 A1* | 1/2016 | Suddreth | ............... | G06F 3/0393 |
| | | | | 345/173 |
| 2016/0378320 A1* | 12/2016 | Suzuki | .................. | B60K 35/10 |
| | | | | 345/158 |
| 2023/0217022 A1* | 7/2023 | Zhong | ................. | H04N 19/167 |
| | | | | 375/240.02 |

FOREIGN PATENT DOCUMENTS

| | | | |
|---|---|---|---|
| EP | 4 092 509 B1 | 3/2023 |
| FR | 3 083 628 B1 | 6/2020 |
| WO | 95/09402 A2 | 4/1995 |

* cited by examiner

PRIOR ART

PRIOR ART

13

14

11

SYSTEM FOR INTERACTING AT A DISTANCE WITH A POINTING MEANS OF AN HMI OF A VIEWING SYSTEM OF AN AIRCRAFT COCKPIT

CROSS-REFERENCE TO RELATED APPLICATION

This application claims priority to foreign French patent application No. FR 2313193, filed on Nov. 28, 2023, the disclosure of which is incorporated by reference in its entirety.

FIELD OF THE INVENTION

The invention bears on a system for interacting at a distance with a pointing means of an HMI of a viewing system of an aircraft cockpit.

The invention relates, generally, to the way to interact with a cockpit system consisting of a display device comprising a single large screen or a plurality of screens which are essentially arranged as a dashboard.

BACKGROUND

An interface between the pilot and the system of an aircraft cockpit consists essentially of multifunctional screens and of control members.

Historically, the control members were separate from the main screens, in the form of control panels provided with various physical interactors, such as switches, rotary selectors or keys.

Subsequently, these control members were partly integrated into the viewing screens, in the form of function keys located around the screen, which are optionally complemented by one or more rotary controls.

However, the interactive experience remains frustrating if it is compared with the world of microcomputing, which is based on the use of windows, menus and icons which can be activated by means of a pointer.

As illustrated in FIG. 1 and FIG. 2, the current cockpit generation has therefore seen the introduction of a device for interacting with a pointing device which is functionally identical to a mouse, called a CCD (an acronym of control cursor device), which is based on a trackball, and which makes it possible to interact directly with the screens of the cockpit. Such a device proves to be impractical in use, it being less natural and efficient to move a pointer with a trackball than with a mouse.

Such a device 1 is depicted in FIG. 1 in the cockpit, and in more detail in FIG. 2.

The user experience of such a device, referred to as a WIMP device (an acronym of "windows, icons, menus and pointer") since it is based on a graphical interface composed of windows, icons and menus which can be activated by means of a pointer.

In use, such a device remains frustrating compared to tablets and other smartphones based on direct touch interaction with the screen.

Recently, civil aeroplane cockpits have been equipped with touchscreens, which makes it possible for the pilot and/or the copilot to interact directly and intuitively with the screens.

In addition, these touchscreens are difficult to use in the event of the presence of vibrations, or when the pilot moves back their seat into the cruise flying position.

Nevertheless, in the context of a cockpit consisting of large screens, or even of a single screen, it is not possible to have the whole display surface within hand's reach, still less at a distance which is compatible with touch gestures.

In rare cases among more recent aeroplanes, several touchscreens are used, with the possibility of also using a CCD.

The document EP 4092509 B1 is known, which bears on a post-WIMP CCD, a drawback of which may be its bulk. Indeed, this CCD has an upper layer in the shape of a V. On the first portion of the V, there are a handrest (or knob) and buttons. The second portion of the V, which comprises a touch surface (touchpad or touchscreen), protrudes substantially from the zone in which it is installed (fastening baseplate) and prevents other equipment from being installed nearby below the touch zone. The invention resolves this bulk problem since the zone of the rest (knob), the touch zone and the buttons are arranged in on a layer in the shape of an inverted V, the surface area of which is substantially equal to that of the fastening baseplate.

SUMMARY OF THE INVENTION

One aim of the invention, i.e. of a post-WIMP CCD, is to provide the pilot and/or the copilot with a compact medium which makes it possible to interact at a distance with the HMIs of the cockpit, ergonomically and efficiently.

The document FR 3083628 B1 is also known, which discloses a system provided with a finger grip which needs to be very near to the screens, and the finger-grip lining requires the presence of a spacing between the various screens.

Another aim of the invention is for it to be able to be used by the pilot in the event of turbulence when it is difficult (or even impossible and/or less productive) to use the touchscreens.

Another aim of the invention is for it to be able to be used comfortably by the pilot or the copilot in all positions, even in the rearward seat position. The forward position (close to the HMIs of the cockpit) is used during critical phases (takeoff and landing) while the rearward position is used in the cruise phase (synonymous with sitting comfort). In this last position, the advantage of the post-WIMP CCD is fully realized since it provides the user with a medium which makes it possible to interact at a distance with the HMIs of the cockpit comfortably (without stretching out their arm to the HMIs).

It is anticipated that two post-WIMP CCDs be installed in the cockpit, one per pilot. It is required that the same product (single part number) be able to be installed for each pilot. The CCD must therefore be designed to be ambidextrous. The ambidextrous function could be useful in small cockpits in which there would be only a single post-WIMP CCD between the two potential users.

Another aim of the invention is for it to be as compact as possible in the cockpit.

Another aim of the invention is for it to be harmoniously integrated, to be easy to clean and to be intuitive to use.

Another aim of the invention is for it to be able to be adapted to the majority of cockpits, and to be able to be adjusted by the user so that it is ergonomical to use for a user with their right hand as well as their left hand, typically in small cockpits where there is room for only a single one which will be used either by the pilot or the copilot.

One aim of the invention is to alleviate the above-mentioned problems.

According to one aspect of the invention, a system for interacting at a distance with a pointing means of an HMI of a viewing system of an aircraft cockpit is proposed, comprising three layers:

an upper layer in the shape of an inverted V, which itself acts as a handrest knob, comprising:

a module, with a touch-sensitive flat surface, configured to interact with the pointing means arranged on a front portion of the inverted V;

at least one physical interactor configured to interact with the HMI arranged on a rear portion of the inverted V; and two lateral edges set back from the upper surface of the upper layer, each provided with at least one physical interactor;

an intermediate layer configured to make it possible to modify the positioning of the upper layer; and a lower layer configured to receive the wired electric power supply and data exchange connections;

the system comprising a palm rejection module configured to make it possible to place the hand or a portion of the arm on the upper layer, which acts as a knob.

In one embodiment, the system comprises a wheel on the rear face configured so as to be able to be accessed by the tips of the hands of the user when used as a handrest.

According to one embodiment, the module, with a touch-sensitive flat surface, configured to interact with the pointing device on the HMIs of the cockpit comprises a multi-contact capacitive touchpad, or a touchscreen configured to implement an alphanumeric keyboard.

In one embodiment, the inverted V has an angular opening of the V of between 135° and 179°.

According to one embodiment, the intermediate layer comprises a baseplate configured to be adapted to the position in which it is installed in the cockpit and to the aircraft.

In one embodiment, the intermediate layer comprises a rotary adaptor, which is configured to rotate the upper layer about a horizontal axis.

According to one embodiment, the intermediate layer comprises a rotary adaptor, which is configured to rotate the elements arranged on top of the baseplate jointly about a vertical axis.

In one embodiment, the module with a touch-sensitive flat surface is a multi-contact capacitive touchpad provided with a, for example micro-LED, backlighting device.

According to one embodiment, the baseplate comprises fastening screw cover devices.

BRIEF DESCRIPTION OF THE DRAWINGS

The invention will be better understood on studying a few embodiments described by way of completely non-limiting examples and illustrated by the appended drawings, in which.

DETAILED DESCRIPTION

In all of the figures, elements having identical references are similar.

Figure 1:
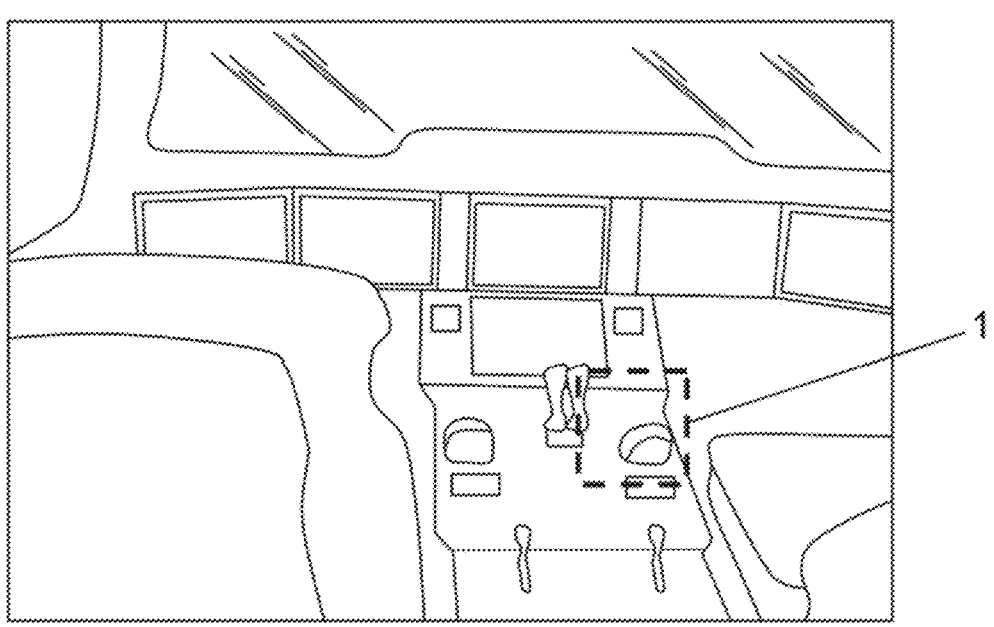
FIG. 1 schematically illustrates a system for interacting at a distance with a pointing means of a viewing system of an aircraft cockpit provided with an HMI, according to the prior art.
Figure 2:
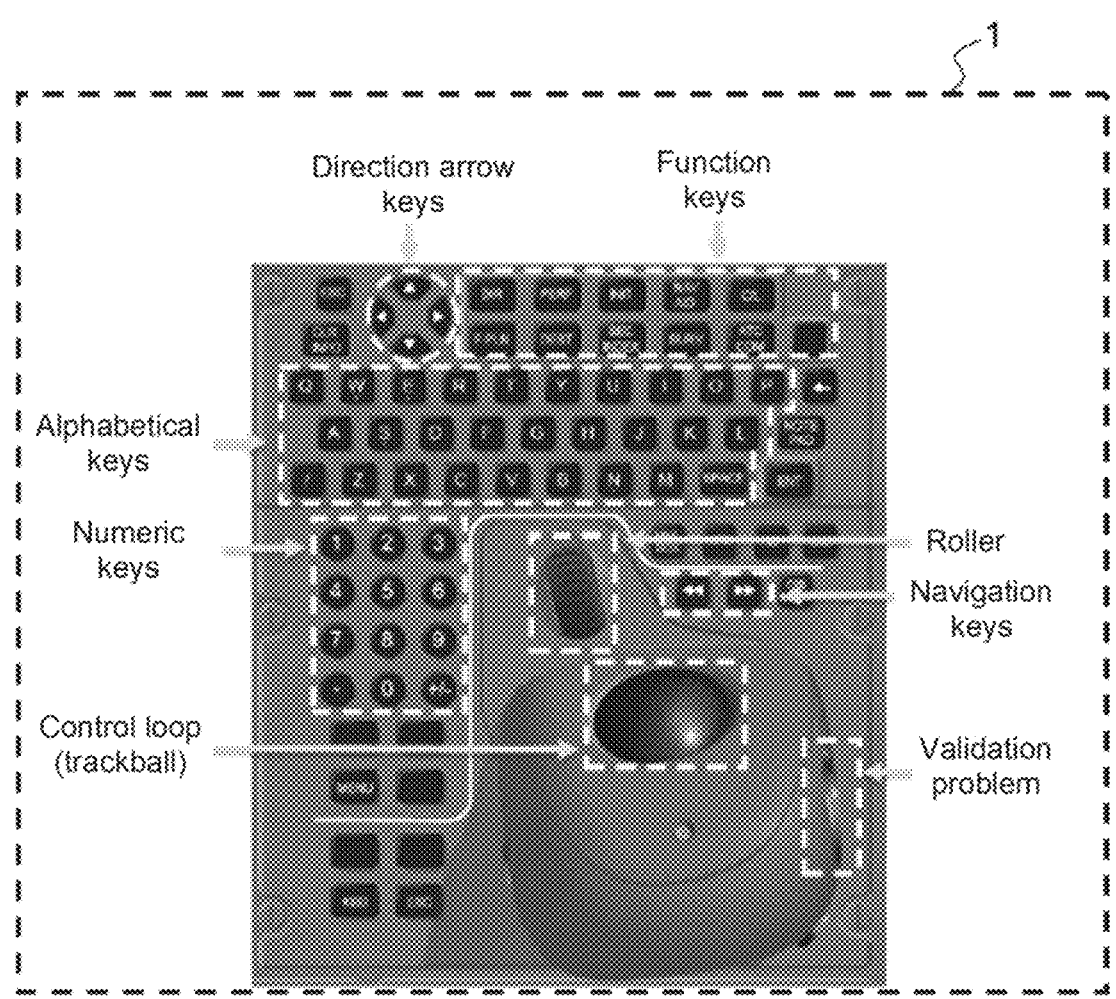
FIG. 2 schematically illustrates a trackball of a system of FIG. 1, according to the prior art.
Figure 3:
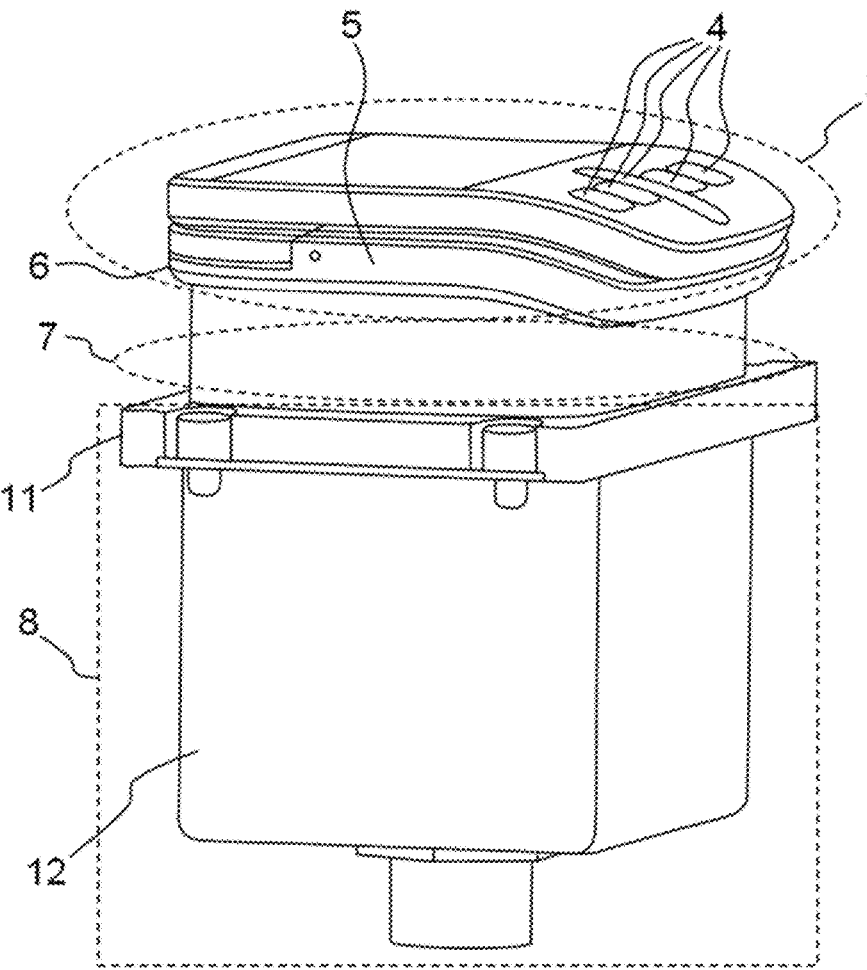
FIG. 3 schematically illustrates a system for interacting at a distance with a pointing means of an HMI of a viewing system of an aircraft cockpit, according to one aspect of the invention.
Figure 4A:
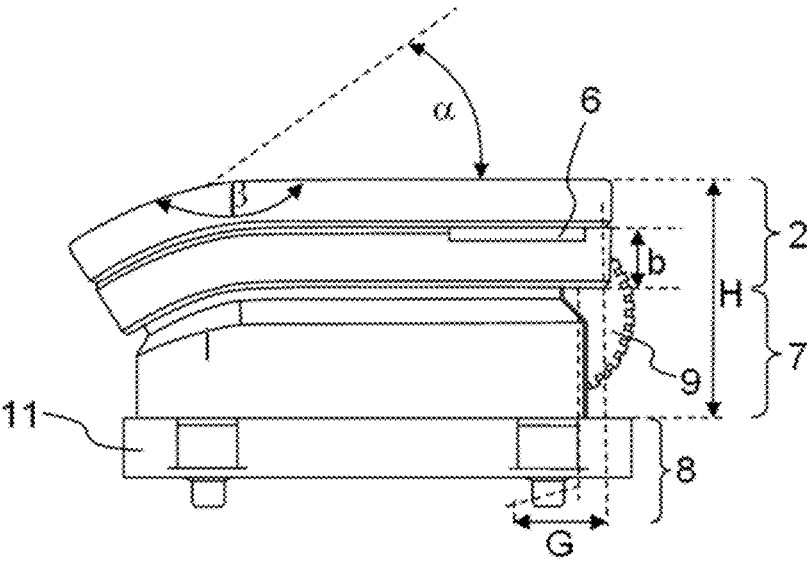
FIG. 4a, FIG. 4b, FIG. 4c, FIG. 4d and FIG. 4e schematically illustrate various views of the system of FIG. 3.
Figure 4B:
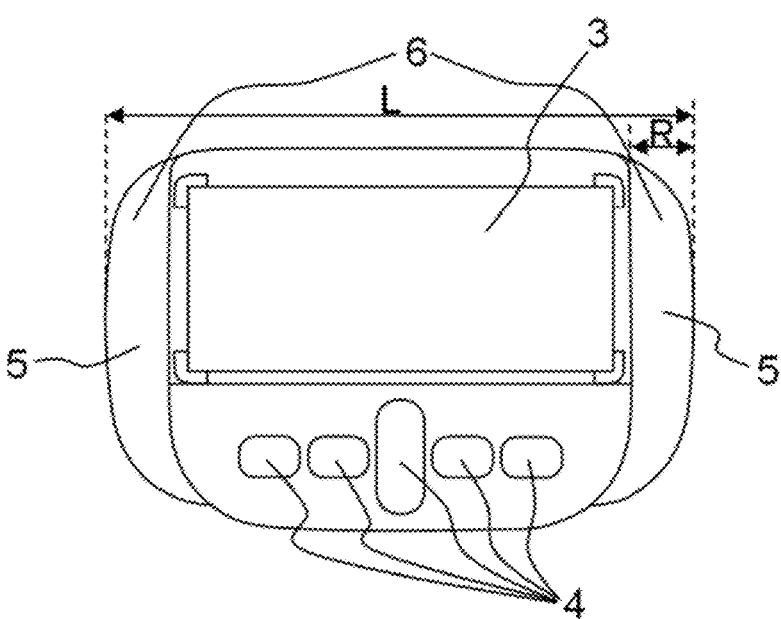
Figure 4C:
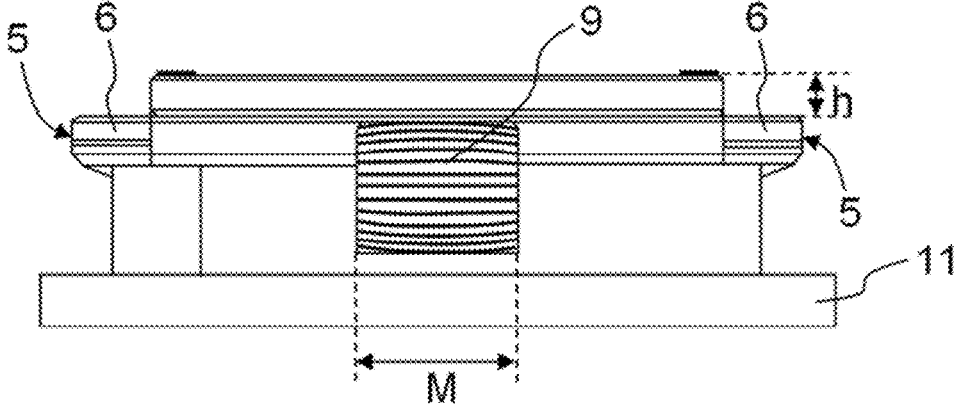
Figure 4D:
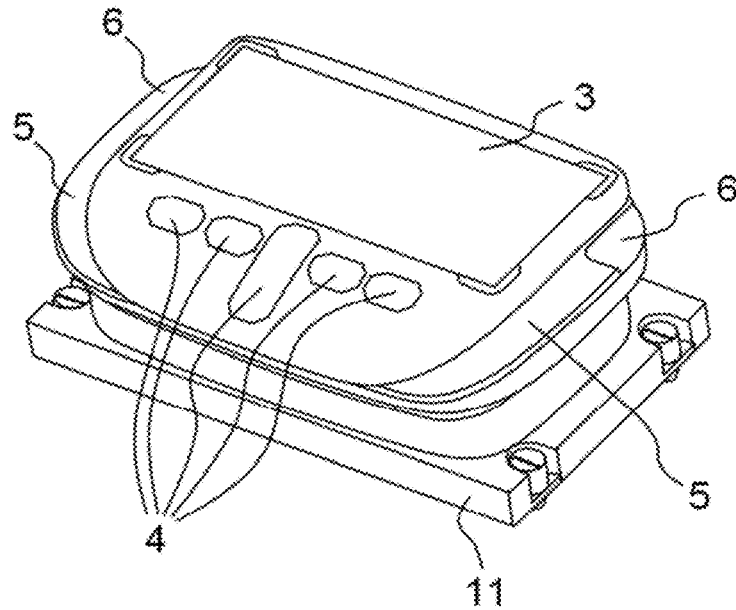
Figure 4E:
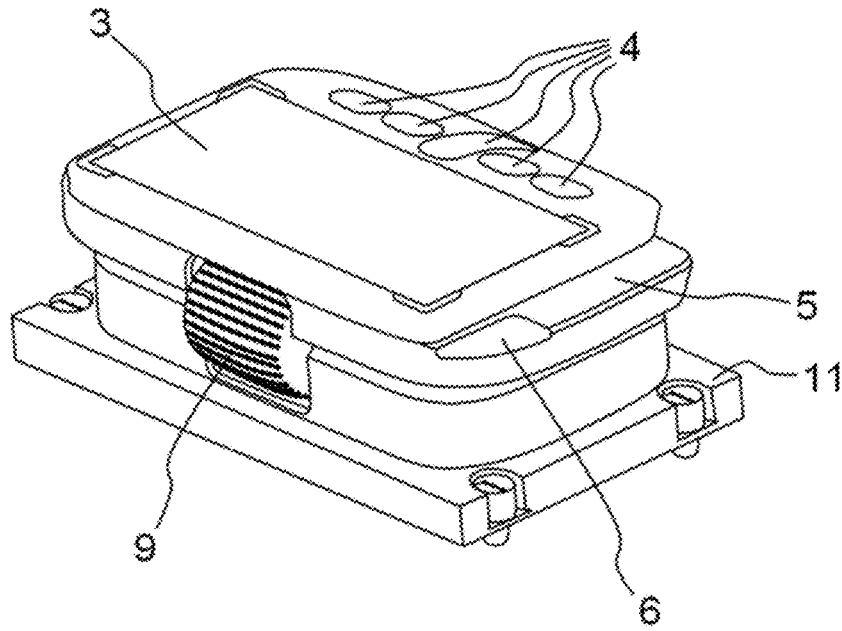

FIG. 3 schematically illustrates a system for interacting at a distance with a pointing means of an HMI of a viewing system of an aircraft cockpit aspect of the invention.

The system for interacting at a distance with a pointing means of an HMI of a viewing system of an aircraft cockpit comprises three layers:

an upper layer 2 in the shape of an inverted V, which itself acts as a handrest knob, comprising:

a module, with a touch-sensitive flat surface 3, configured to interact with the pointing means arranged on a front portion of the inverted V;

at least one physical interactor 4 configured to interact with the HMI arranged on a rear portion of the inverted V;

two lateral edges 5 set back from the upper surface of the upper layer 2, each provided with at least one physical interactor 6; and an intermediate layer 7 configured to make it possible to modify the positioning of the upper layer 2; and a lower layer 8 configured to receive the wired electric power supply and data exchange connections;

the system comprising a palm rejection module configured to make it possible to place the hand or a portion of the arm on the upper layer 2, which acts as a knob.

Designing the system in three layers in order to adapt to all holders and to various places in the cockpit (pedestal, central console or even in the armrest), while at the same time ensuring an ergonomical position for the user (pilot or copilot).

FIG. 4a, FIG. 4b, FIG. 4c, FIG. 4d and FIG. 4e schematically illustrate various views of the system of FIG. 3.

The inverted V has an angular opening β of the V of between 135° and 179°, and the incline a of the touch-sensitive flat surface 3 may be between 0 and 45° with respect to the horizontal.

The system comprises a wheel 9 on the rear face configured so as to be able to be accessed by the tips of the hands of the user when used as a handrest. It is arranged so as to straddle the intermediate layer 7 and upper layer 2.

The module, with a touch-sensitive flat surface 3, configured to interact with the pointing device on the HMIs of the cockpit comprises a multi-contact capacitive touchpad, or a touchscreen configured to implement an alphanumeric keyboard.

The three-layered architecture depicted in the figures has the following features:

an upper layer 2 comprising:

a touch-sensitive zone of the dimensions: 30 mm≤length≤110 mm and 30 mm≤width≤110 mm and typically 108 mm×48 mm;

lateral edges 5 of width R, 10 mm≤R≤50 mm, typically R=15 mm, and of height b, 10 mm≤b≤40 mm, typically b=12 mm;

a wheel 9 at the front of the system and under the touch-sensitive zone. The wheel 9 has a width M, 3 mm≤M≤50 mm, typically M=30 mm, preferably with a slight curvature and knurling for a better grip;

an intermediate layer 7 comprising:

a body around the wheel 9 set back G with respect to the upper layer 2 in order to ensure a grip for the hand of the user (notably in the event of vibrations or jolts) with 3 mm≤G≤20 mm, and typically G=6 mm;

a lower layer 8 or back end, which is shared by all the holders, comprising a fastening baseplate 11 with, for example, four screws and a rear housing 12 with a cross section which is smaller than that of the baseplate 11. The height of the lower layer 8 depends on the aircraft models.

The upper layer 2 and intermediate layer 7 together have dimensions of width L, 50 mm≤L≤150 mm, typically L=140 mm, and of height H, 20 mm≤H≤100 mm, typically H=40 mm.

The materials used for are those commonly used for cockpit equipment. The materials around the touch-sensitive zone 3 are non-metallic, in this instance made of plastic in order not to interfere with its operation.

Figure 5:
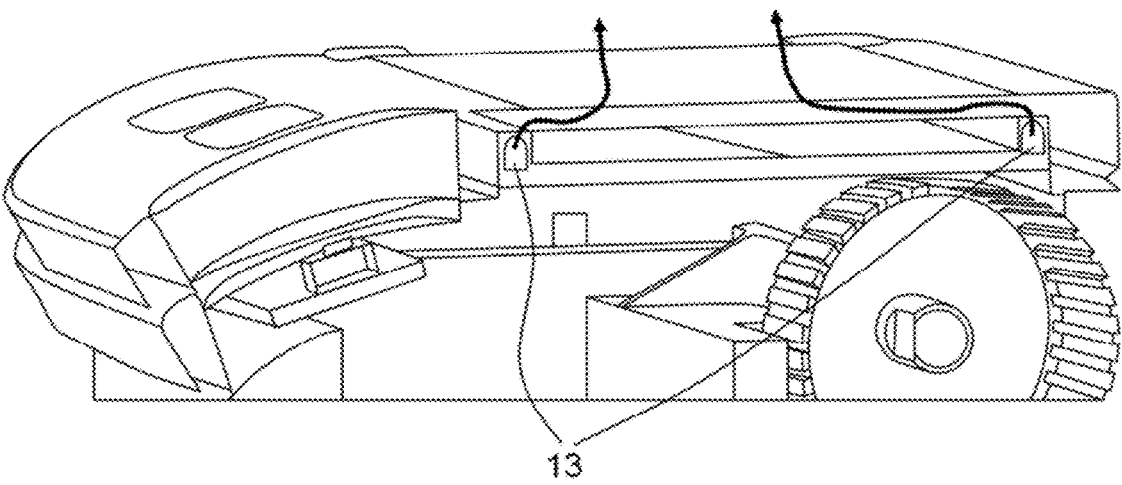
FIG. 5 schematically illustrates one embodiment of the system of FIG. 3, comprising a micro-LED backlighting device, according to one aspect of the invention.

For example, the upper layer may be made of plastic with metallization (EMI protection) outside the touch-sensitive zone 3. As a variant, the upper layer may be made of aluminium with a transparent plastic insert on top of the touch-sensitive zone 3 with (photosensitive or fluorescent) paint or a screen-printed sticker on the bottom face. The keys may or may not be visible without backlighting. Backlighting the virtual keyboard may be made possible by virtue of a light source, such as micro-LEDs 13, as illustrated in FIG. 5.

Figure 6:
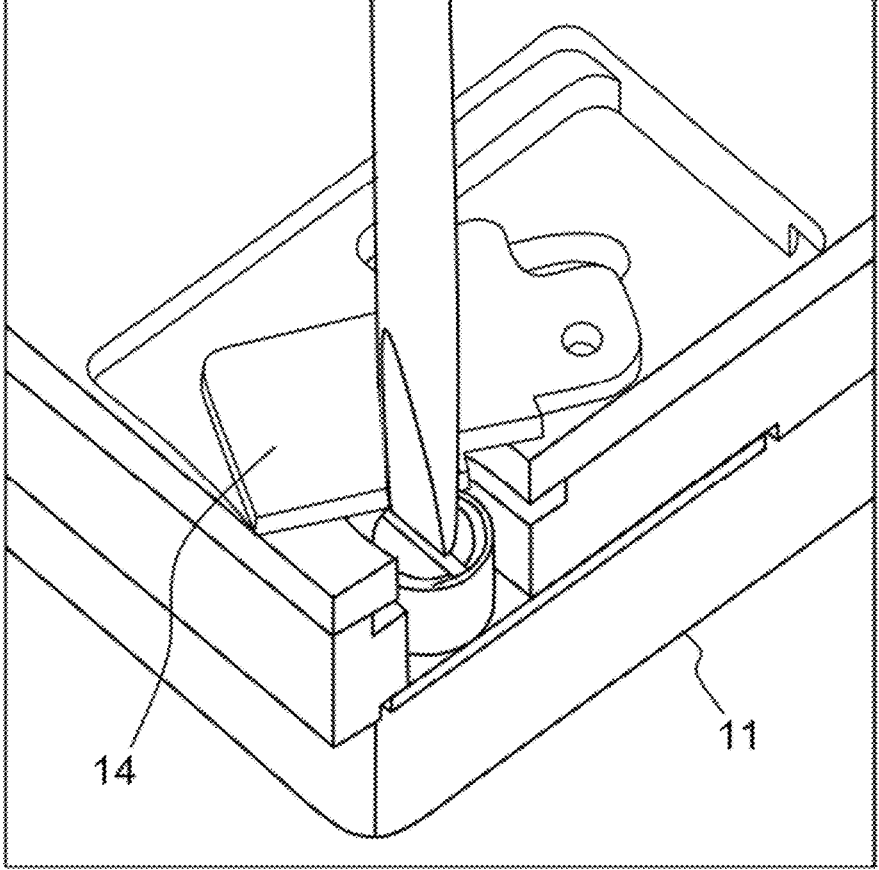
FIG. 6 schematically illustrates one embodiment in which the baseplate comprises fastening screw cover devices, according to one aspect of the invention.

As illustrated in FIG. 6, the baseplate 11 comprises fastening screw cover devices 14. The fastening screw cover devices 14 improve the perceived quality and represent an advantage from the health point of view. A cover 14, such as a plate or a valve, may be repositioned on top of a fastening screw by virtue of a return spring or permanent magnet. The movement of a cover 14 may be a translation and/or a rotation optionally associated with zigzagging. This system improves the cleaning of the system without compromising availability or maintainability. Indeed, no specific tool or additional tool is needed to access the fastening screws.

Figure 7A:
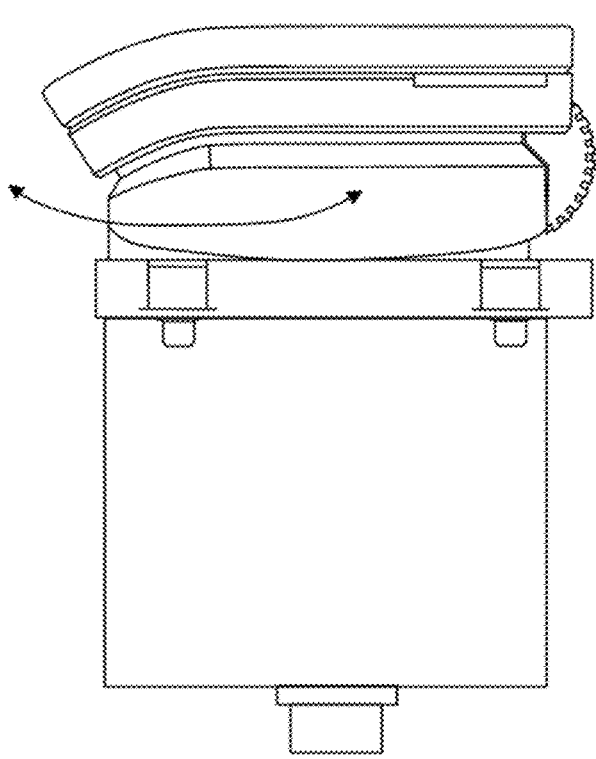
FIG. 7a and FIG. 7b schematically illustrate one embodiment of the system of FIG. 3, which makes it possible to rotate the upper layer about a horizontal axis, according to one aspect of the invention.
Figure 7B:
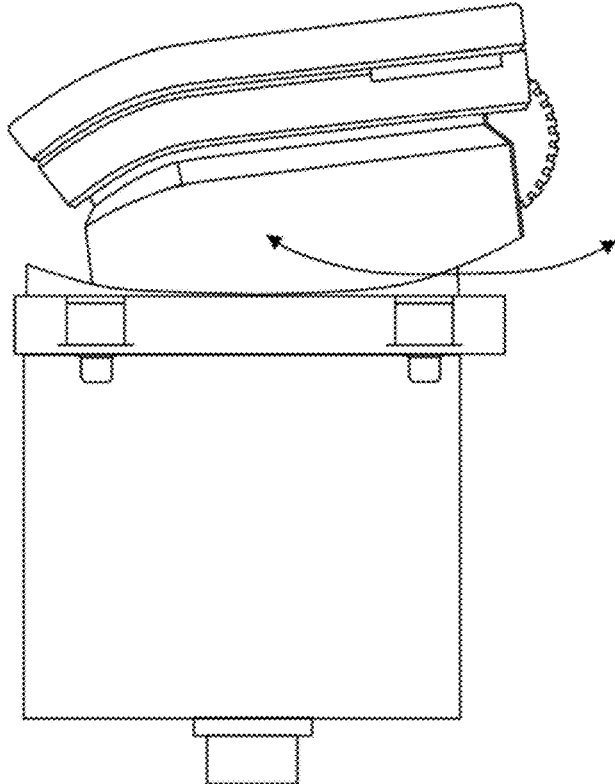

The intermediate layer 7 may comprise a rotary adaptor, which is configured to rotate the upper layer 2 about a horizontal axis, as depicted by the double-headed arrow in FIG. 7a and FIG. 7b.

Figure 8A:
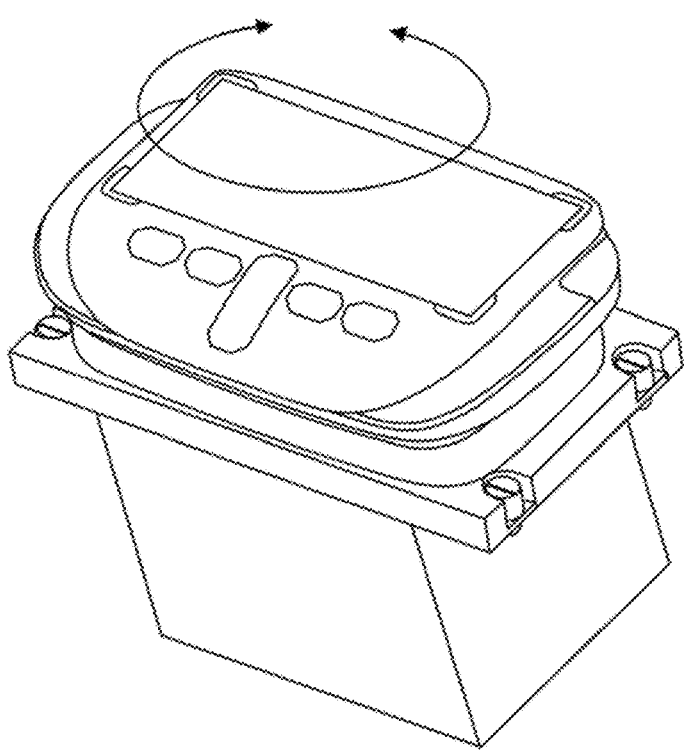
FIG. 8a and FIG. 8b schematically illustrate one embodiment of the system of FIG. 3, which makes it possible to rotate the elements arranged on top of the baseplate about a vertical axis, according to one aspect of the invention.
Figure 8B:
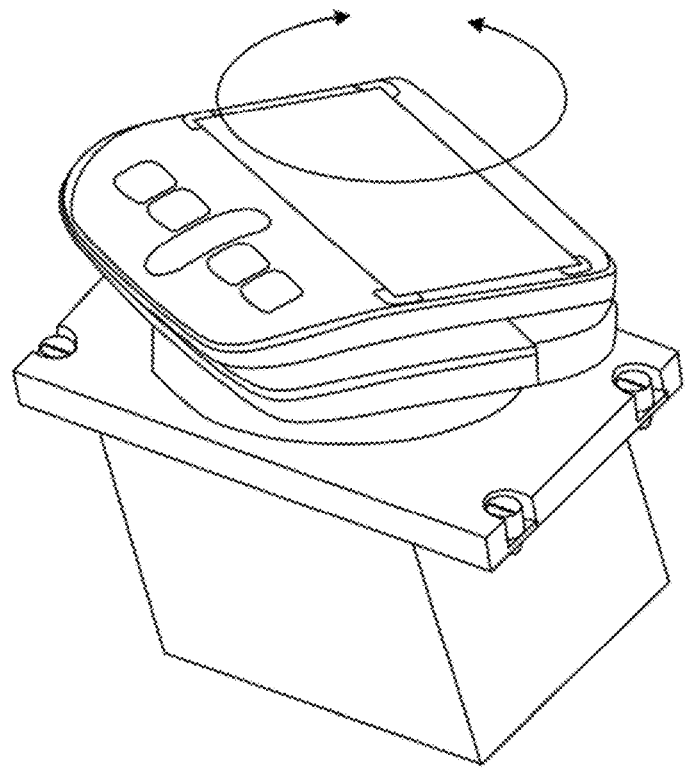

The intermediate layer 7 may comprise a rotary adaptor, which is configured to rotate the elements arranged on top of the baseplate 11 jointly about a vertical axis, as depicted by the double-headed arrow in FIG. 8a and FIG. 8b.

Figure 9A:
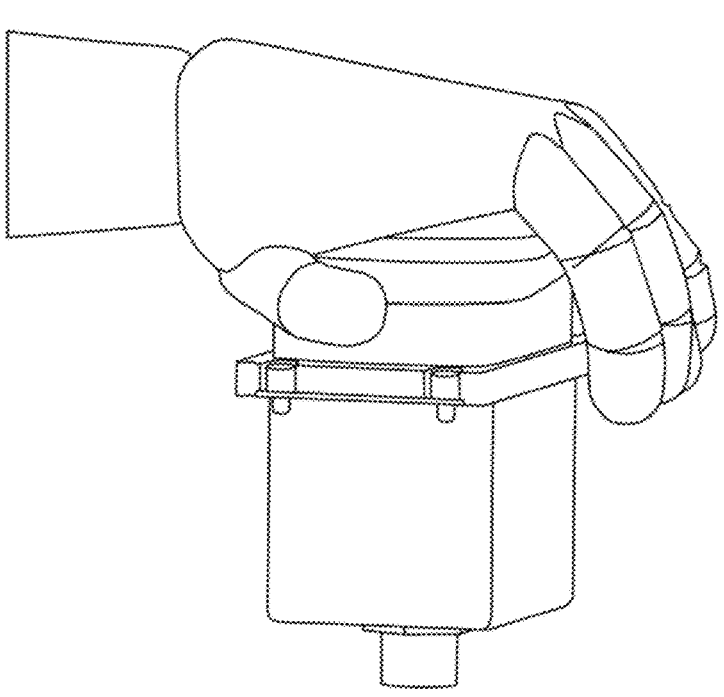
FIG. 9a and FIG. 9b schematically illustrate the placing of a hand and arm of a user, a pilot or copilot, on the system of FIG. 3, according to one aspect of the invention.
Figure 9B:
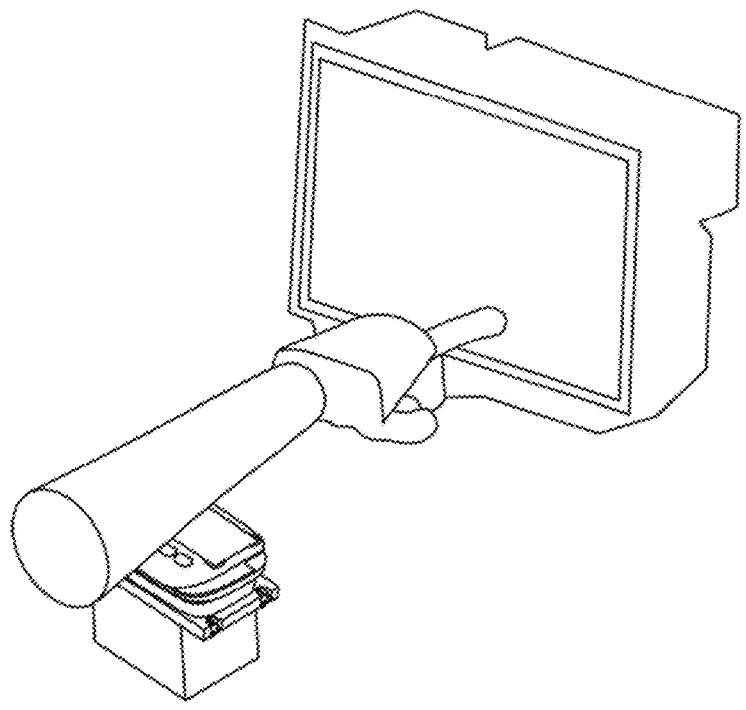

As illustrated in FIG. 9a and FIG. 9b, the presence of a module configured to implement a palm rejection function makes it possible to be able to place the hand or another portion of the arm of the user.

As illustrated in FIG. 9b, the presence of a handrest ensures the stability of the user in their interaction actions and limits their fatigue.

Figure 10A:
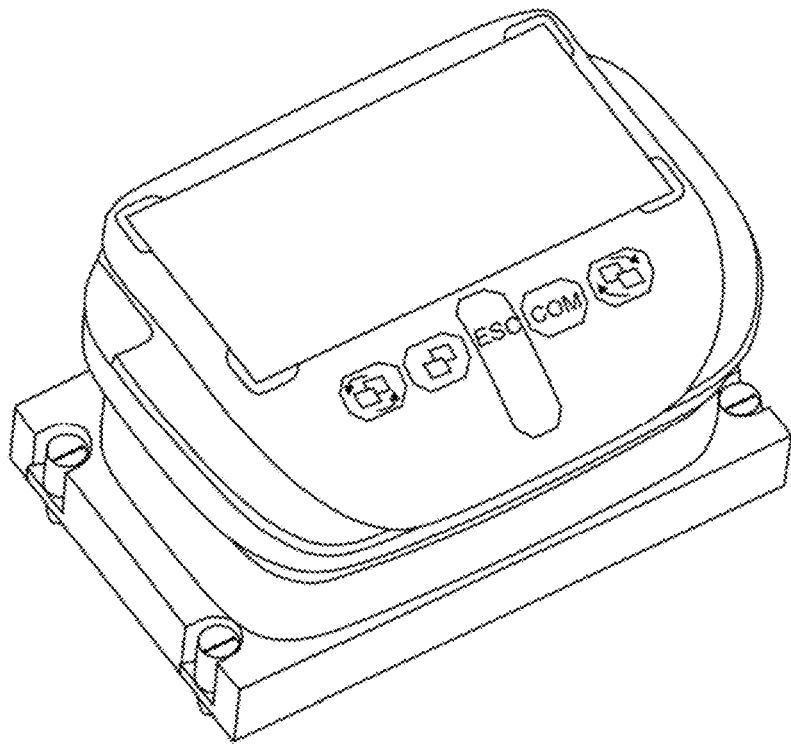
FIG. 10a and FIG. 10b schematically illustrate the system of FIG. 3, in touchpad mode and in keyboard mode, according to one aspect of the invention.
Figure 10B:
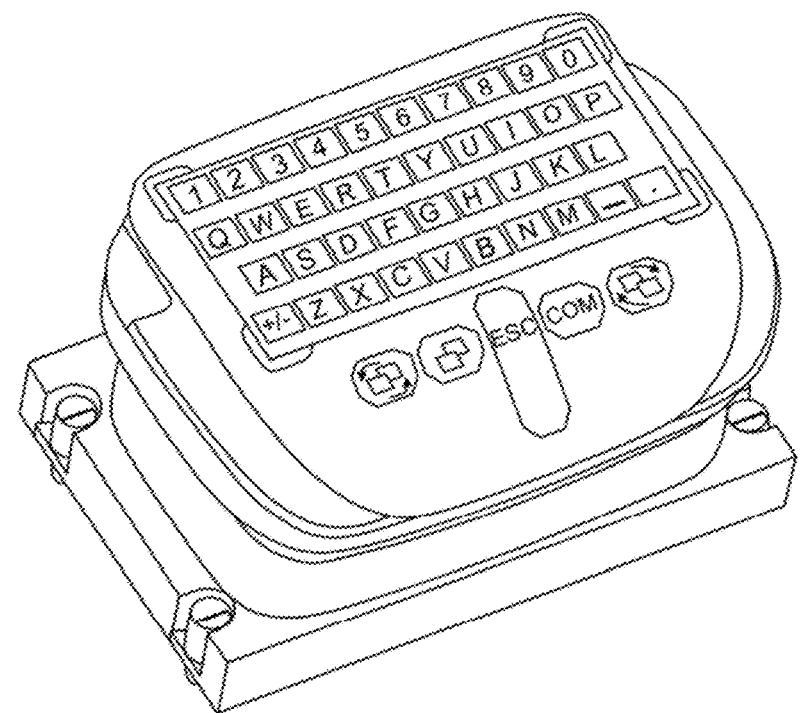

FIG. 10a and FIG. 10b are examples of a system in touchpad mode and in keyboard mode, respectively, according to aspects of the invention.

The invention claimed is:

1. A system for interacting at a distance with a pointer of a human-machine interface (HMI) of a viewing system of an aircraft cockpit, comprising three layers:

an upper layer in the shape of an inverted V, comprising a module, with a touch-sensitive flat surface, configured to interact with the pointer, arranged on a front portion of the inverted V;

at least one physical interactor arranged on a rear portion of the inverted V; and two lateral edges set back from an upper surface of the upper layer, each provided with at least one physical interactor;

an intermediate layer configured to make it possible to modify a positioning of the upper layer; and a lower layer configured to receive electric power supply and data;

the system being configured to make it possible to place the hand or a portion of the arm on the upper layer.

2. The system according to claim 1, comprising a wheel on a rear face configured so as to be able to be accessed by the tips of the hands of a user when used as a handrest.

3. The system according to claim 1, wherein the module, with a touch-sensitive flat surface, comprises a multi-contact capacitive touchpad, or a touchscreen configured to implement an alphanumeric keyboard.

4. The system according to claim 1, wherein the inverted V has an angular opening of between 135° and 179°.

5. The system according to claim 1, wherein the intermediate layer comprises a baseplate configured to be adapted to a position in which it is installed.

6. The system according to claim 5, wherein the baseplate comprises fastening screw cover devices.

7. The system according to claim 1, wherein the intermediate layer comprises a rotary adaptor, which is configured to rotate the upper layer about a horizontal axis.

8. The system according to claim 1, wherein the intermediate layer comprises a rotary adaptor, which is configured to rotate elements arranged on top of the baseplate jointly about a vertical axis.

9. The system according to claim 1, wherein the module with a touch-sensitive flat surface is a multi-contact capacitive touchpad provided with a backlighting device.

\* \* \* \* \*